US010122072B2

(12) United States Patent
Zaghloul et al.

(10) Patent No.: US 10,122,072 B2
(45) Date of Patent: Nov. 6, 2018

(54) NANOFABRIC ANTENNA

(75) Inventors: Amir I. Zaghloul, Bethesda, MD (US); Steven D. Keller, Essex, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 492 days.

(21) Appl. No.: 13/369,334

(22) Filed: Feb. 9, 2012

(65) Prior Publication Data

US 2013/0207850 A1    Aug. 15, 2013

Related U.S. Application Data

(60) Provisional application No. 61/445,211, filed on Feb. 22, 2011.

(51) Int. Cl.
*H01Q 1/27* (2006.01)
*H01Q 21/06* (2006.01)
*B82Y 10/00* (2011.01)

(52) U.S. Cl.
CPC .......... *H01Q 1/273* (2013.01); *H01Q 21/06* (2013.01); *B82Y 10/00* (2013.01); *Y10T 29/49016* (2015.01)

(58) Field of Classification Search
CPC .......... H01Q 1/38; H01Q 1/368; H01Q 1/273
USPC ........ 343/718, 720, 701, 702, 909; 977/742, 977/950
See application file for complete search history.

(56) References Cited

U.S. PATENT DOCUMENTS

| | | | | |
|---|---|---|---|---|
| 3,096,520 A | * | 7/1963 | Ehrenspeck | 343/834 |
| 4,582,111 A | * | 4/1986 | Kuehn et al. | 164/46 |
| 4,891,651 A | * | 1/1990 | Staehlin | H01Q 3/2676 342/372 |
| 6,038,060 A | * | 3/2000 | Crowley | B82Y 20/00 257/465 |
| 6,377,216 B1 | * | 4/2002 | Cheadle | H01Q 9/0407 343/700 MS |
| 7,079,079 B2 | * | 7/2006 | Jo | H01Q 1/243 343/700 MS |
| 7,250,920 B1 | * | 7/2007 | Steinbrecher | 343/853 |
| 7,501,985 B2 | * | 3/2009 | Qian et al. | 343/702 |
| 7,705,797 B2 | * | 4/2010 | Philippakis | 343/833 |
| 7,714,798 B2 | * | 5/2010 | Lashmore et al. | 343/897 |
| 7,764,236 B2 | * | 7/2010 | Hill et al. | 343/702 |
| 7,782,261 B2 | * | 8/2010 | An | H01Q 9/0442 343/702 |
| 2006/0119525 A1 | * | 6/2006 | Cohen | H01Q 1/273 343/718 |

(Continued)

OTHER PUBLICATIONS

H. Bajwa, et al., "Nanostructured Conformable Patch Antenna Array," International Conference on Information and Emerging Technologies (ICIET) Jun. 2010.

(Continued)

*Primary Examiner* — Dameon E Levi
*Assistant Examiner* — Hasan Islam
(74) *Attorney, Agent, or Firm* — Alan L Kalb; Eric Brett Compton

(57) ABSTRACT

A nanofabric antenna is provided. The nanofabric antenna can include a fabric and a plurality of conductive nanowires extending outwardly from the fabric with the conductive nanowires forming a random array of monopoles. In this manner, an antenna can be included as part of a piece of clothing and/or a piece of fabric used or worn by an individual.

20 Claims, 1 Drawing Sheet

(56) References Cited

U.S. PATENT DOCUMENTS

2009/0315802 A1* 12/2009 Johansen ............ H01Q 13/085
343/853
2010/0155692 A1   6/2010 Tran

OTHER PUBLICATIONS

Amir I. Zaghloul, Steven J. Weiss, W. O'Keefe Coburn, Youn Lee, and Steven D. Keller "Advanced Concepts for Negative-Index Metamaterials and Nano-Antennas," META '10 2nd International Conference on Metamaterials, Photonic, Crystals and Plasmonics, Cairo, Egypt, Feb. 22, 2010. (Slide Presentation).

Amir I. Zaghloul, Steven J. Weiss, William O. Coburn, Youn Lee, Steven D. Keller, "Advanced Concepts for Negative-Index Metamaterials and Nano-Antennas," META '10 2nd International Conference on Metamaterials, Photonic, Crystals and Plasmonics, Cairo, Egypt. (Abstract only, submitted prior to conference). Available online at: http://meta10.lgep.supelec.fr/index.php/uneta/META10/paper/view/485 (Website indicates "Last modified: Nov. 4, 2009").

G.W. Hanson, "Radiation efficiency of nano-radius dipole antennas in the microwave and far-infrared Regimes," IEEE Antennas and Propagation Magazine, vol. 50, No. 3, Jun. 2008, pp. 66-77.

I. Kang et. al.,"Introduction to carbon nanotube and nanofiber smart materials", Composites Part B: Engineering, vol. 37, Issue 6, 2006, pp. 382-394.

"Textile Based Carbon Nanostructured Flexible Antenna," NTC Project No. M06-MD01, NTC Annual Report: Nov. 2006.

P.J. Burke, S. Li, Z. Yu, "Quantitative theory of nanowire and nanotube antenna performance," IEEE Transactions on Nanotechnology, vol. 5, No. 4, Jul. 2006, pp. 314-334.

P.J. Burke, Z. Yu, C. Rutherglen, "Carbon Nanotubes for RF and Microwaves", Proceedings for the 13th GAAS Symposium, 2005.

B. Kimball, et. al., "Diffraction effects in honeycomb arrays of multiwalled carbon nanotubes", Proceedings of SPIE, vol. 5515, 2004, pp. 223-229.

* cited by examiner

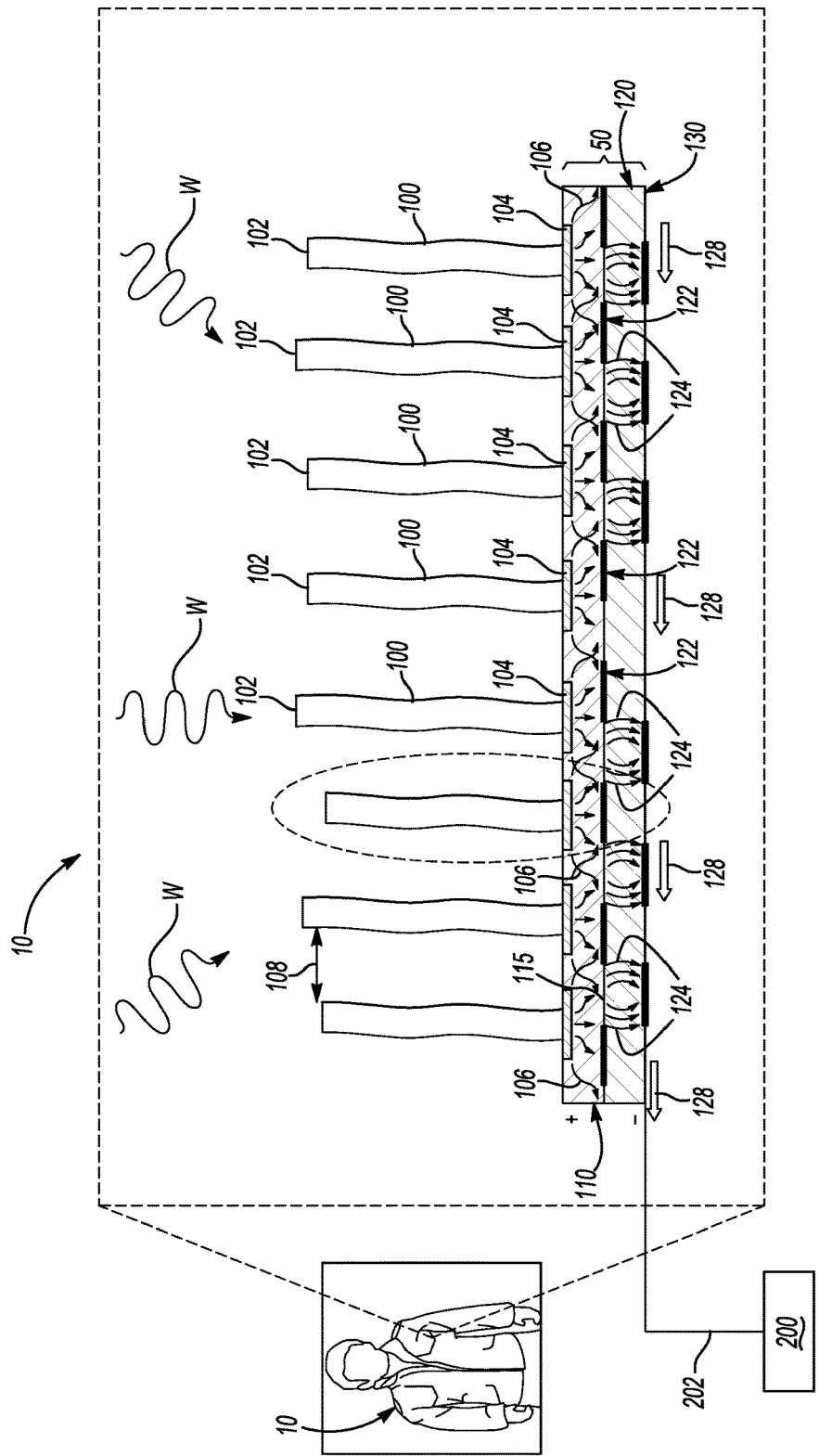

NANOFABRIC ANTENNA

CROSS REFERENCE TO RELATED APPLICATION(S)

This application claims the benefit of U.S. Provisional Application No. 61/445,211, filed Feb. 22, 2011.

GOVERNMENT INTEREST

The invention described herein may be manufactured, used, and licensed by or for the United States Government.

FIELD OF THE INVENTION

The present invention relates in general to an antenna and in particular to a nanofabric antenna.

BACKGROUND OF THE INVENTION

The use of antennas for wireless communication is well known. Such antennas typically intercept electromagnetic waves propagating through space and produce a relatively small voltage that affords for an alternating electric current to be supplied to an integrated receiver. In addition, such antennas can have an oscillating electric current applied thereto and radiate energy in the form of electromagnetic waves into space.

Heretofore antennas have typically required an extended piece of metallic material, for example standard quarter-wavelength whip antennas known to those skilled in the art. However, such antennas can be cumbersome and when used in a military situation visually compromising. As such, an antenna that can be concealed, is lightweight and preferably seamlessly integrated into a piece of fabric would be desirable.

SUMMARY OF THE INVENTION

A nanofabric antenna is provided. The nanofabric antenna can include a fabric and a plurality of conductive nanowires extending outwardly from the fabric. In some instances, the plurality of conductive nanowires can be a plurality of carbon nanotubes. In addition, the plurality of carbon nanowires can form a random array of monopoles with each nanowire operable to have approximate vertical alignment with random geometric undulations relative to the incident electromagnetic waves.

The fabric can also have a periodic aperture layer and a power reception layer, with the plurality of conductive nanowires each having a base that is coupled through the periodic aperture layer to the power reception layer. In some instances, an integrated receiver can be included and the power reception layer can be coupled thereto and thereby transmit an alternating current from the plurality of conductive nanowires to the integrated receiver. In this manner, an antenna can be included as part of a piece of clothing and/or a piece of fabric used by an individual. For example, the fabric with the plurality of conductive nanowires can be an outer layer of an individual's uniform.

It is appreciated that the plurality of conductive nanowires, the periodic aperture layer of the fabric, and the power reception layer of the fabric in combination with the integrated receiver can receive and/or transmit electromagnetic waves as part of a wireless receiver and/or transmitter, respectively, and thus for example be part of a radio communication unit.

A process for providing a fabric that serves as an antenna is also provided, the process including providing a piece of fabric and attaching a plurality of conductive nanowires to the piece of fabric. The plurality of conductive nanowires extend outwardly from the piece of fabric and form a random array of monopoles that are operable to have approximate vertical alignment with random geometric undulations relative to incident electromagnetic waves and/or applied alternating current. The piece of fabric has a periodic aperture layer and a power reception layer, and the plurality of conductive nanowires each has a base that is coupled through the periodic aperture layer to the power reception layer. In addition, an integrated receiver coupled to the power reception layer can be provided and be operable to provide an alternating current to or receive an alternating current from the plurality of conductive nanowires.

BRIEF DESCRIPTION OF THE DRAWINGS

FIG. 1 is a schematic illustration of a nanofabric antenna according to an embodiment of the present invention.

DETAILED DESCRIPTION OF THE INVENTION

The present invention provides an antenna that can be incorporated within a piece of fabric and the fabric can be a piece of clothing, a tent material, material for part of a motor vehicle convertible top, and the like. The antenna can be considered a nanofabric antenna in which a plurality of conductive nanowires are attached to and extend outwardly from the piece of fabric.

The plurality of conductive nanowires can form a random array of monopoles with each nanowire operable to have approximate vertical alignment with random geometric undulations relative to an incident electromagnetic wave or to an applied alternating current. Stated differently, the conductive nanowires can effectively form an array of monopoles with approximate vertical alignment, but with random "wiggles" or "waviness" in their shape. As such, the conductive nanowires may not be exactly vertical, however the extent of the distortions in their vertical alignment can be randomly distributed across all the elements in a given array and thus the impact of these "geometric undulations" are or will be minor with respect to the overall array performance.

The plurality of conductive nanowires can also afford a randomly spaced antenna array that can be modeled using random physical characteristics of the array elements and unequal coupling of the array element outputs to a periodic beam-forming and/or power combining network. It is appreciated that the modeling and/or analysis of the randomly spaced antenna array can afford for an antenna that is operable to receive and/or transmit desired electromagnetic waves as part of a wireless communication unit.

The fabric can also have a periodic aperture layer and a power reception layer, and each of the plurality of conductive nanowires can have a base that is coupled through the periodic aperture layer to the power reception layer. Through this coupling, an electromagnetic wave incident upon the random geometric undulations of the plurality of conductive nanowires can provide an alternating current that is transmitted to an integrated receiver. Thus the plurality of conductive nanowires, the periodic aperture layer of the fabric, the power reception layer of the fabric, and the integrated receiver can receive and/or transmit electromagnetic waves. In some instances, the fabric with the plurality of conductive nanowires can be an outer layer of a piece of clothing, for example and for illustrative purposes only, an outer layer of a military uniform. In addition, the plurality of conductive nanowires can be a plurality of carbon nanotubes.

Turning now to FIG. 1, an embodiment of a nanofabric antenna is shown generally at reference numeral 10. As shown in the FIGURE, the nanofabric antenna 10 can be part of a piece of clothing, e.g. a jacket, worn by an individual. The piece of clothing can have an outer layer 50 that includes a plurality of conductive nanowires 100 extending outwardly from a periodic aperture layer 110 that is attached to, coupled to, and/or part of a power reception layer 120. Each of the conductive nanowires 100 has a distal end 102 and a base or base end 104. The base 104 is attached to the periodic aperture layer 110 and through the attachment an incident electromagnetic wave or applied alternating current is coupled between the nanowire 100 and its base 104 to/from the power reception layer 120. In addition, the random geometric undulations exhibited by the plurality of vertically-aligned conductive nanowires 100 afford for received electric field lines 106 to be coupled through periodic apertures 122 which guide the electric field lines 124 to the power reception layer 120. The periodic apertures 122 are openings in a conducting layer 115 separating layers 110 and 120. Layers 110 and 120 can be made of soft dielectric material that can be shaped in the form of the fabric. The conducting layer 115 that supports the periodic apertures 122 and the conducting circuitry layer 130 that bounds layer 120 are flexible and can be shaped to conform with the fabric.

It is appreciated that directing of the electric field lines 106 through the periodic apertures 122 affords for an alternating current 128 to be delivered to an integrated receiver 200. For example, the received electric field lines 106 can be directed through the periodic apertures 122 which can be further coupled to a power reception/transfer circuitry layer 130 which is in electronic communication to the integrated receiver 200.

It is appreciated that the plurality of conductive nanowires 100 can intercept electromagnetic waves W with the length of each nanowire 100 determining an individual monopole pattern. In addition, with the flexible fabric 50 having the embedded pattern of conductive nanowires 100, interception of the electromagnetic waves W by the plurality of conductive nanowires 100 can afford the induced alternating current 128 that is provided to the integrated receiver 200 via a connection 202 as is known to those skilled in the art.

In addition, random element spacing 108 can be present between adjacent conductive nanowires which in combination with the length and geometric undulations of the vertically-aligned nanowires provides an overall random array of monopoles which have an omnidirectional pattern. In the aggregate, the nanofabric antenna can have a nearly isotropic pattern. Not being bound by theory, comprehensive analysis and simulations of the random array structure and its feeding network to a periodic structure such as a periodic aperture layer provides an antenna operable to receive and transmit electromagnetic waves as part of a wireless communication unit.

The plurality of conductive nanowires can be attached or embedded in the piece of fabric using any method or technique known to those skilled in the art including vapor deposition techniques, precipitation techniques, and the like. In addition, future techniques not yet developed to attach or embed conductive nanowires to a piece of fabric are included within the scope of the invention.

The fabric layer 50, periodic aperture layer 110, and/or power reception layer 120 can be made from flexible materials such as natural fibers, flexible polymer fibers, flexible carbon fibers, flexible metallic fibers and the like. In addition, the conductive nanotube layer can have a fuzzy/fabric-like texture and act as an outer skin of the whole or entire fabric structure. It can also be embedded into a military-pattern material such as part of a uniform, a tent material, material used as part of a motor vehicle convertible top, a flag material, and the like.

A process for providing the nanofabric antenna can include providing the fabric layer 50 and attaching the plurality of conductive nanowires 100 thereto. It is appreciated that the layer of fabric 50 has the periodic aperture layer 110 and the power reception layer 120. In addition, the random array of monopoles provided by the conductive nanowires 100 in combination with the physical and dimensional characteristics of the periodic aperture layer 110 and power reception layer 120 are selected such that the nanofabric antenna 10 functions as an antenna array over a relatively broad frequency band.

The foregoing description is illustrative of particular embodiments of the invention, but is not meant to be a limitation upon the practice thereof. The following claims, including all equivalents thereof, are intended to define the scope of the invention.

We claim:
1. A nanofabric antenna comprising:
a fabric formed of a plurality of flexible fibers;
an array of antenna monopoles comprising a plurality of conductive nanowires that are carbon nanotubes configured to transmit and receive radio waves extending outwardly from the surface of said fabric in an approximately vertical direction and having random geometric undulations in their shape in the direction of their extension to provide randomness relative to the direction of incident radio waves; and
circuitry connected to said fabric which is configured to provide and/or receive electrical signals corresponding to said radio waves.

2. The nanofabric antenna of claim 1, wherein said fabric has a periodic aperture layer and a power reception layer, said plurality of conductive nanowires each having a base coupled through said periodic aperture layer to said power reception layer.

3. The nanofabric antenna of claim 2, further comprising an integrated receiver, said power reception layer coupled and operable to transmit an alternating current from said plurality of conductive nanowires to said integrated receiver.

4. The nanofabric antenna of claim 3, wherein said plurality of conductive nanowires, periodic aperture layer, power reception layer and integrated receiver are operable to receive and transmit radio waves of a desired frequency range.

5. The nanofabric antenna of claim 1, wherein each of the conductive nanowires includes a base end attached to or embedded in the fabric and a distal end extending outwardly from the surface of the fabric.

6. The nanofabric antenna of claim 1, wherein the spacings between adjacent conductive nanowires in the array of monopoles are random.

7. The nanofabric antenna of claim 1, wherein the lengths of the extension from the fabric of the conductive nanowires in the array of monopoles are random.

8. The nanofabric antenna of claim 1, wherein the fabric is flexible and non-conductive.

9. The nanofabric antenna of claim 1, wherein the conductive nanotubes provide the fabric with a fuzzy texture.

10. The nanofabric antenna of claim 1, wherein the conductive nanotubes have random wiggles or waviness in their shape in the direction of their extension.

11. The nanofabric antenna of claim 1, wherein the flexible fibers are polymer fibers, carbon fibers or metallic fibers.

12. A piece of clothing having a nanofabric antenna outer layer, said piece of clothing comprising:
   a piece of clothing selected from a group consisting of a jacket, a coat, a shirt, a hat, and a pair of pants, said piece of clothing having an outer layer of fabric formed of a plurality of flexible fibers; and
   an array of antenna monopoles comprising a plurality of conductive nanowires that are carbon nanotubes configured to transmit and receive radio waves extending outwardly from the surface of said outer layer of fabric in an approximately vertical direction and having random geometric undulations in their shape in the direction of their extension to provide randomness relative to the direction of incident radio waves and to an applied alternating current,
   wherein said outer layer of fabric has a periodic aperture layer and a power reception layer, said plurality of conductive nanowires each having a base coupled through said periodic aperture layer to said power reception layer, and further comprises an integrated receiver, said power reception layer coupled and operable to transmit the alternating current from said plurality of conductive nanowires to said integrated receiver.

13. The piece of clothing of claim 12, wherein said plurality of conductive nanowires, periodic aperture layer and power reception layer are operable to receive radio waves of a desired frequency range and provide the alternating current to said integrated receiver.

14. The piece of clothing of claim 12, wherein said plurality of conductive nanowires, periodic aperture layer and power reception layer are operable to receive an alternating current from said integrated receiver and send radio waves of a desired frequency range.

15. The nanofabric antenna of claim 12, wherein the fabric further comprises:
   a conductive layer having apertures separating the periodic aperture layer and the power reception layer; and
   a conducting circuitry layer adjacent to the power reception layer which connects to the integrated receiver.

16. The nanofabric antenna of claim 12, wherein the periodic aperture layer and the power reception layer are formed of dielectric material.

17. A process for providing a fabric that serves as an antenna, the process comprising:
   providing a piece of personal clothing capable of being worn by an individual comprising a piece of fabric formed of a plurality of flexible fibers;
   forming an array of monopoles by attaching a plurality of conductive nanowires that are carbon nanotubes configured to transmit and receive radio waves to the piece of fabric, the plurality of conductive nanowires extending outwardly from the surface of the piece of fabric in an approximately vertical direction and having random geometric undulations in their shape in the direction of their extension to provide randomness relative to the direction of incident radio waves and to an applied alternating current so as to provide an antenna;
   connecting the fabric to circuitry configured to provide and/or receive electrical signals corresponding to said radio waves.

18. The process of claim 17, wherein the piece of fabric includes a periodic aperture layer and a power reception layer with the plurality of conductive nanowires each having a base coupled through the periodic aperture layer to the power reception layer.

19. The process of claim 18, further including providing an integrated receiver coupled to the power reception layer and operable to receive the alternating current from the plurality of conductive nanowires.

20. The process of claim 19, wherein the integrated receiver is operable to provide an alternating current to the plurality of conductive nanowires and the plurality of vertically-aligned conductive nanowires with random geometric undulations are operable to receive incident radio waves of a desired frequency.

* * * * *